May 24, 1960  J. MARTIN  2,937,829
HOODS OR CANOPIES OF AIRCRAFT
Filed April 15, 1955  7 Sheets-Sheet 1
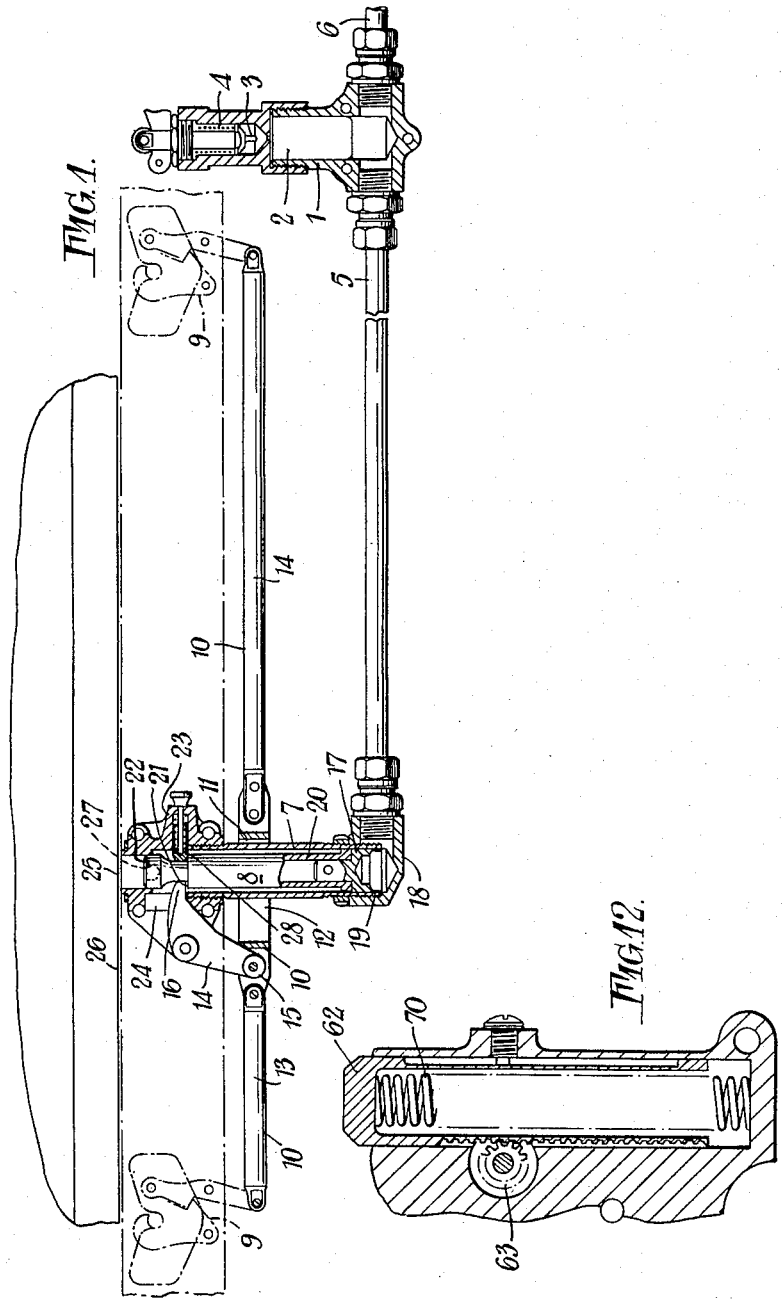
Inventor
JAMES MARTIN
per Worth Wade
Attorney.

May 24, 1960   J. MARTIN   2,937,829
HOODS OR CANOPIES OF AIRCRAFT
Filed April 15, 1955   7 Sheets-Sheet 2
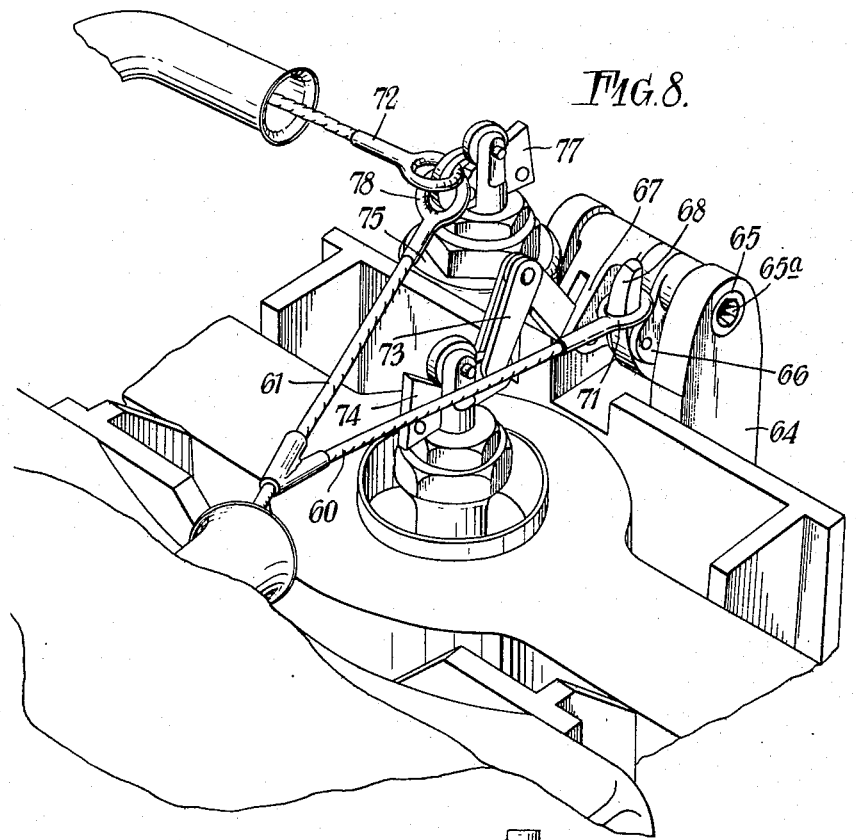
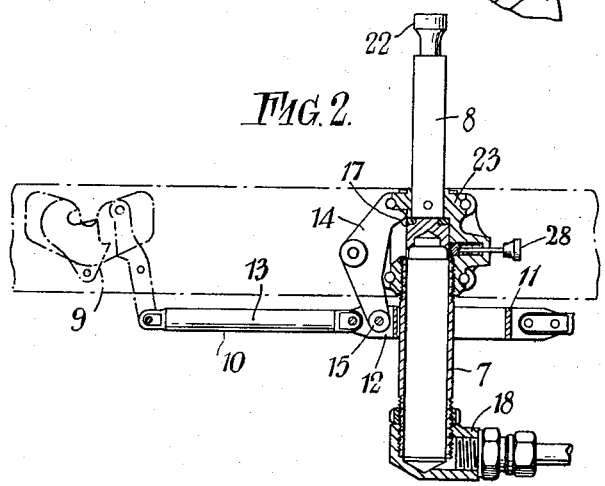
Inventor
JAMES MARTIN
per Worth Wade
Attorney.

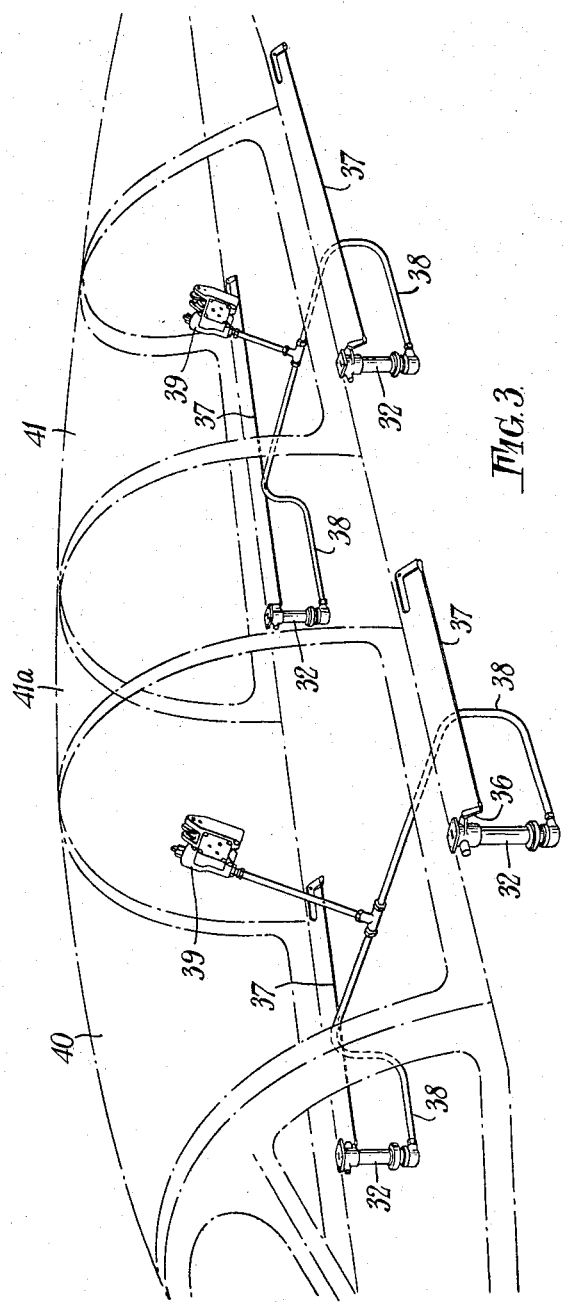

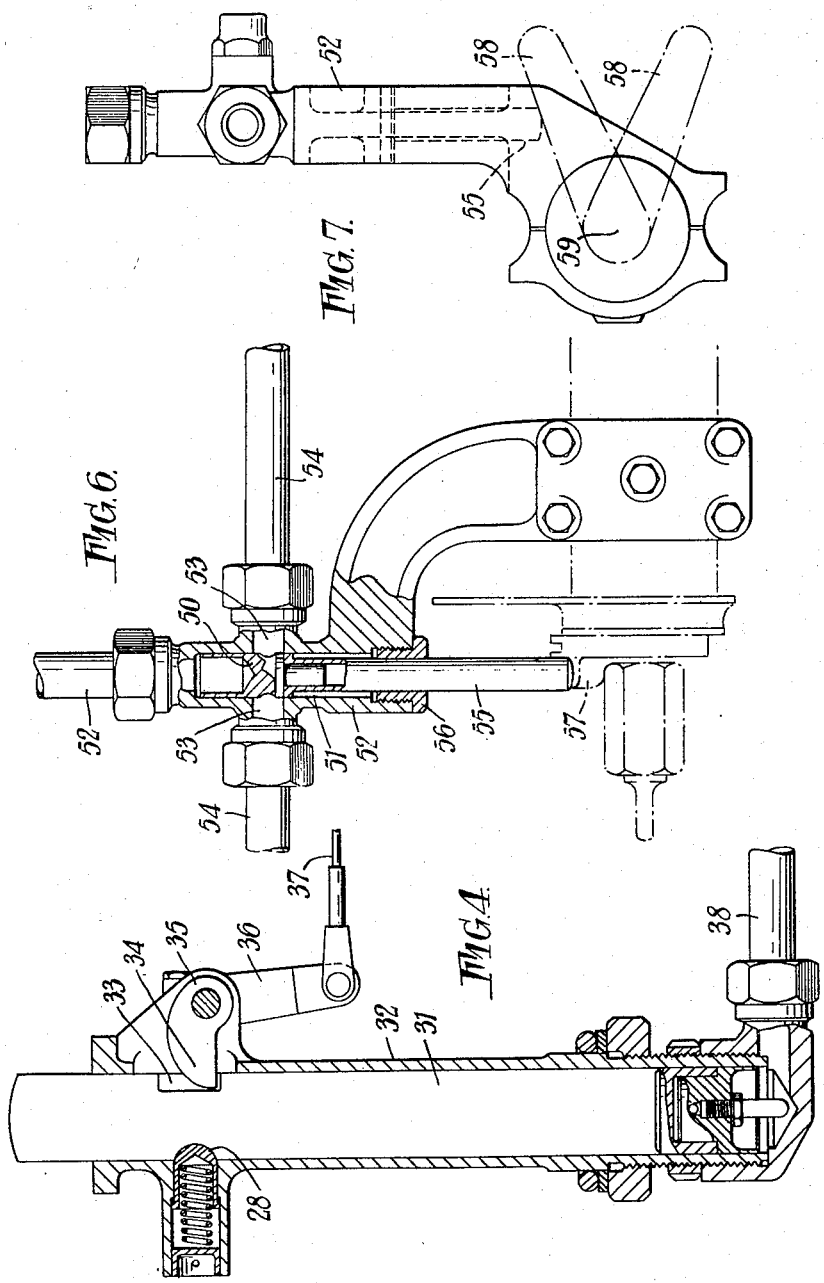

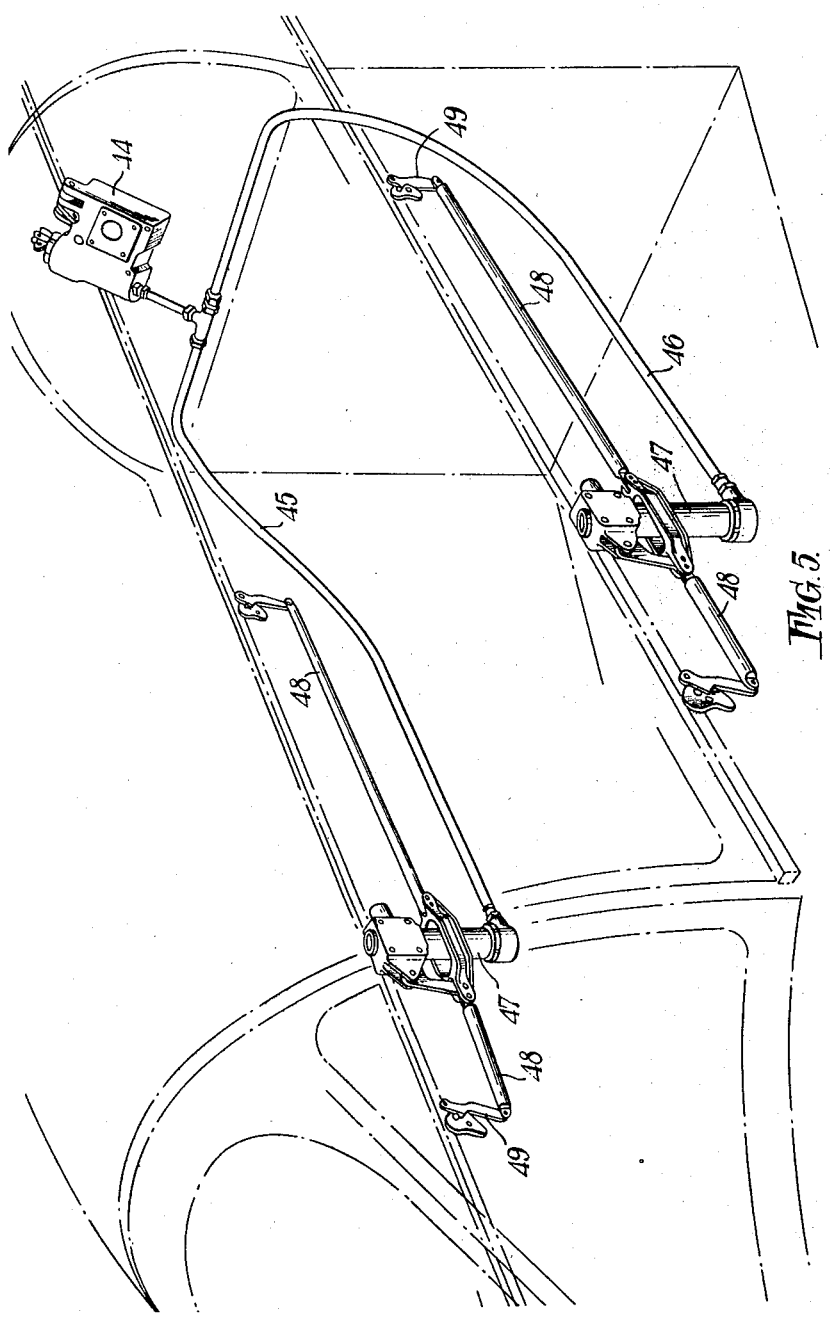

May 24, 1960 J. MARTIN 2,937,829
HOODS OR CANOPIES OF AIRCRAFT
Filed April 15, 1955 7 Sheets-Sheet 6
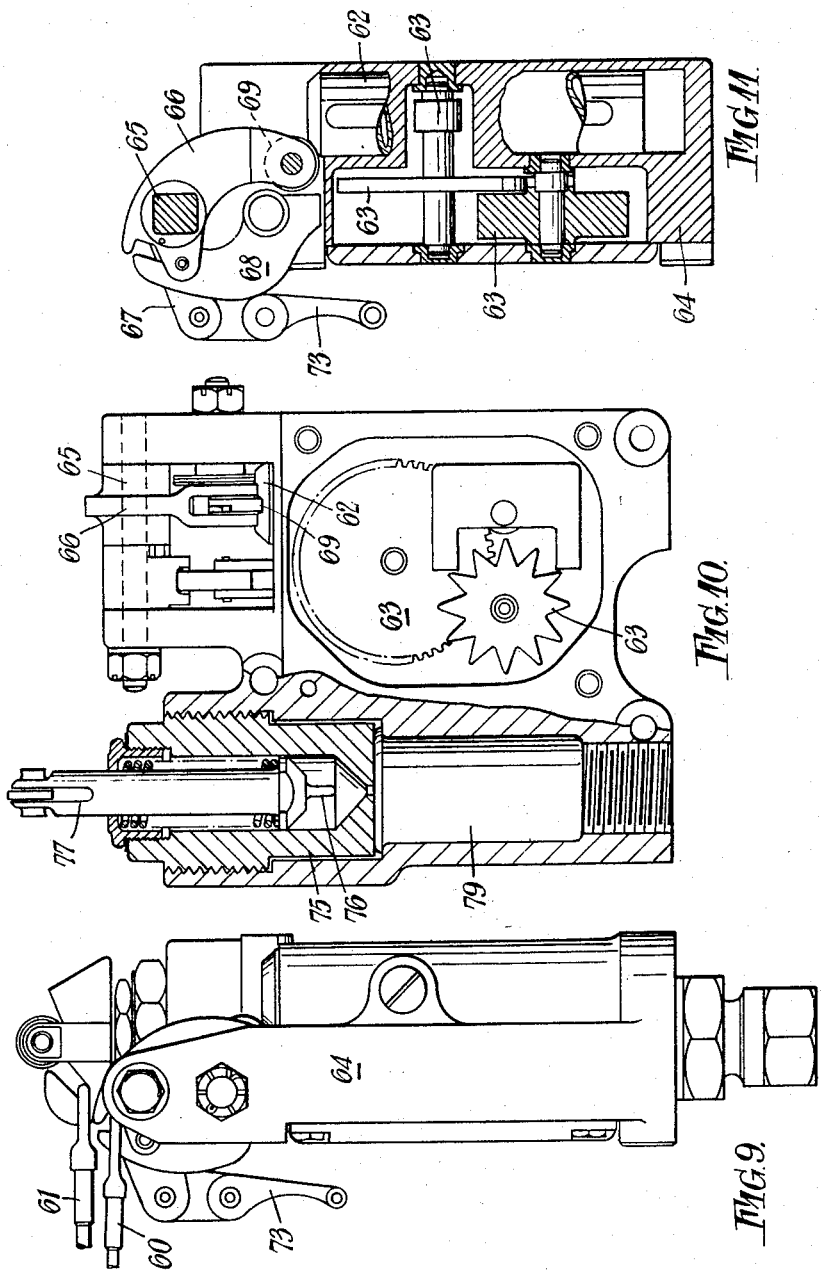
Inventor
JAMES MARTIN.
per *Worth Wade*
Attorney.

May 24, 1960.  J. MARTIN  2,937,829
HOODS OR CANOPIES OF AIRCRAFT
Filed April 15, 1955  7 Sheets-Sheet 7
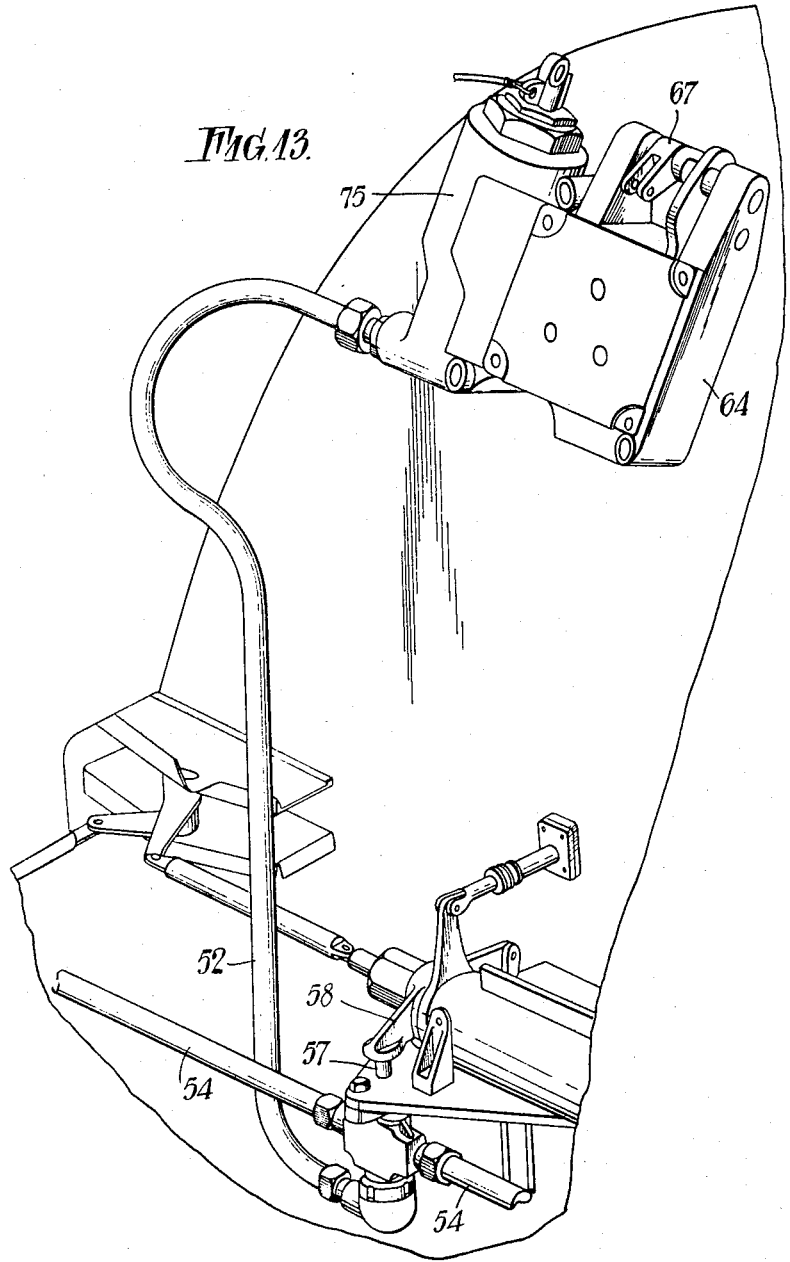
Inventor
JAMES MARTIN
per *Worth Wade*
Attorney.

United States Patent Office 2,937,829
Patented May 24, 1960

2,937,829

HOODS OR CANOPIES OF AIRCRAFT

James Martin, Southlands, Southlands Road, Denham, England

Filed Apr. 15, 1955, Ser. No. 501,685

Claims priority, application Great Britain Apr. 22, 1954

3 Claims. (Cl. 244—121)

The present invention concerns improvements in and relating to the hoods or canopies of aircraft.

It is directed to mechanism for jettisoning the hood or canopy of an aircraft.

The present method of jettisoning the cockpit hood or canopy consists of means for releasing locks and relying mainly or entirely upon aerodynamic forces to suck off the hood or canopy. In many cases this has been found to be insufficient and manual assistance has had to be used.

In certain conditions of flight, for instance, in inverted spin, the aerodynamic forces might in fact tend to hold the hood or canopy so firmly in position after release of the locks that even a resort to manual assistance would be insufficient.

When manual assistance is required airmen have to waste valuable seconds in pushing off the hood after having released the locks which normally hold the hood in position.

It is particularly desirable that this time lag before the hood is jettisoned after release of the locks should be avoided.

The invention is applicable for use with seats adapted to be ejected from an aircraft, although it is understood that the invention is not limited to aircraft provided with an ejection seat.

An object of the present invention is to provide mechanism whereby the necessity of a pilot having to push off the hood manually is avoided.

The present invention comprises jacks actuated by fluid pressure which mechanism first of all releases latch locks or other locking means normally holding the hood or canopy in position on the airplane and then themselves proceed at once to lift and jettison the hood or canopy, so that an airman is relieved of the necessity to apply a manual force to jettison, or assist in jettisoning, the hood or canopy.

It is to be understood that no claim is made to the latch locks or other locking means normally holding the hood or canopy in position as these are of any standard type.

The fluid pressure may be generated or supplied by any suitable method, one way, and that hereinafter described, being by means of an explosive charge which can be fired manually or by automatic means. When used in conjunction with an ejection seat the present canopy jettisoning mechanism may be combined with the firing mechanism of the gun for ejecting the seat and actuated by way of a known blind or screen adapted to be drawn into position over the face of the occupant of the seat and means inter-connecting the blind or screen with firing mechanism for actuating the said jettisoning mechanism and also with firing mechanism for the seat ejection gun, it being understood that the firing is in sequent order, the jettisoning canopy mechanism being the first to be actuated.

Means will also be provided so that if the airman wishes to jettison the canopy only without the use of the face screen he may do so by means of a separate hand control preferably mounted in a convenient position on the seat pan.

The accompanying drawings illustrate examples of the carrying into effect of the invention.

In the drawings:

Fig. 1 is a part sectional elevation of one construction showing the mechanism in normal position.

Fig. 2 is a part sectional elevation of the same construction showing the mechanism positioned after jettisoning the hood.

Fig. 3 is a diagrammatic perspective view showing the mechanism applied to an aircraft having front and rear movable canopies or hoods and a fixed portion interposed between.

Fig. 4 is a sectional view of the jack piston and cylinder used in Fig. 3.

Fig. 5 is a diagrammatic perspective view of an installation in another type of aircraft.

Fig. 6 is a sectional view of a by-pass control described in detail later.

Fig. 7 is a side view of Fig. 6.

Fig. 8 is a perspective view of a firing unit for the hood or canopy jettison mechanism combined with time delay mechanism controlling the firing of the ejection gun for ejecting a seat from an aircraft.

Fig. 9 is a side elevation of the combined firing unit and time delay mechanism.

Fig. 10 is a view showing section of firing unit and time delay mechanism with cover plate removed.

Fig. 11, an end view in section of the time delay mechanism.

Fig. 12, a sectional view of a rack component embodied in the time delay mechanism, and Fig. 13, a diagrammatic view of the by-pass arrangement shown in Figs. 8 to 12 in use, it being understood that the trip lever and allied parts are known.

Referring to the construction illustrated by Figs. 1 and 2:

A firing unit comprises a breech 1 containing an explosive cartridge 2, a firing pin 3, a spring 4 serving to urge the firing pin towards the cap of the cartridge. Any suitable means may be provided for locking and releasing the firing pin 3, the said means being either manually or automatically actuated.

Leading from the breech 1 are pipe lines 5 and 6, the other ends of which are coupled to cylinders 7 in which work jack pistons 8. The pressure gases generated by the firing of the cartridge 2 flows along these pipe lines to the interior of the cylinders 7.

The firing unit is common to all the cylinders 7 and jack pistons 8 therein.

In this construction there are two latch locks 9 of known design for the hood or canopy at each side thereof and two cylinders and jack pistons, one at each side.

The pipe line 5 is coupled to the cylinder on one side, and the pipe line 6 is coupled to the cylinder on the other side.

The firing unit is located on or adjacent the back of the airman's, e.g. the pilot's seat.

The latch locks on one side of the hood are coupled together by a connecting link 10 so as to be released simultaneously. In like manner the latch locks on the other side are coupled together. All the latch locks are actuated at the same time.

The connecting link 10 is made up of components, for example, a central component 11 having a slot 12 through which the cylinder 7 extends, and outer end components 13, 14 pivoted to the central component 11. The other ends of the components 13 and 14 are attached to the known latch locks 9.

Adjacent each cylinder 7 is a pivoted lever 14 having one end secured at 15 to the connecting link 10 and the other end formed as a pawl 16.

The jack piston 8 has a lower cupped end 17. The pipe line leading from the firing unit is connected by a union piece 18 to the lower end of the cylinder 7 in which the jack piston 8 works. The cupped end 17 has a thin wall 19 to permit expansion sealing under pressure of the fluid from the firing unit. Extending upwardly from the cupped end 17 the jack piston 8 has a piston rod 20 of lesser diameter.

Towards the upper end of the piston rod 20 there is a shoulder 21. Normally seated on this shoulder is the pawl 16 of the pivoted catch 14.

The shouldered down part extends upwardly and is expanded in diameter to form the jack piston head 22. This shouldered down part and the head is housed within a bracket-like fitting 23 secured by a screw union to the cylinder 7, the pivoted catch 14 working through a slot 24 in said fitting 23.

The head 22 normally rests against a depending part 25 fixed to the hood rail 26 of the aeroplane and is held for stability by a pin 27 projecting from said part.

Means are provided, such as a spring controlled plunger 28 for holding the jack piston in position against forces set up by negative G. This plunger 28 is housed within the fitting 23.

The operation of the mechanism to jettison the hood is as set out below:

The fluid pressure is generated in the breech 1 of the firing unit by means of an explosive charge. The firing of the cartridge is done either by the pilot manually or by some automatic means set in motion by the pilot.

The fluid pressure generated passes along the pipe lines 5 and 6 to the cylinders 7 of the jack pistons 8, with the result that the jack pistons commence to move upwardly. During the first part of this movement the shoulder 21 on the piston rod 20, presses upwardly against the pawl 16, and swings the catch 14 about its pivot. The other end of the catch 14 imparts a longitudinal movement to the connecting link 10 which results in the release of the latch locks 9 so that the hood is freed. On the continued upward movement of the jack pistons the heads 22 exert a force on the hood so that this is forced off by the created fluid pressure actuating the jack pistons, these first releasing the hood latch levers and then jettisoning the hood.

Fig. 1 shews the parts in normal position before actuation and Fig. 2 the parts when the latch locks have been freed and the hood jettisoned.

It has been previously mentioned that mechanism according to the invention can be used in many types of aircraft and is not confined to those having ejection seats.

In the further constructional examples described and shewn in the invention is applied to aircraft having ejection seats, although it is to be understod these variant constructions can be used in aircraft not having ejection seats.

Figs. 3 and 4 illustrate variant constructions particularly as regards the cylinders and jack pistons. It will be seen from Fig. 4 that a piston 31 works in a cylinder 32. Towards the upper end of the piston 31 is a groove 33. Within the groove 33 is a nose 34 of a pivoted member 35 secured to an arm 36, the other end of which arm is connected to a cable 37 leading to the known hood latch locks.

As in the previous construction there is a spring controlled plunger 28 for holding the jack piston in position against forces set up by negative G.

The fluid pressure generated passes along pipe lines 38 to the cylinders 32. The firing unit 39 is described later with reference to Figs. 8 to 12 of the drawings.

It will be seen from Fig. 3 that the invention is applied to a type of aircraft having a front hood 40 and a rear hood 41. The firing units are mounted on the rear face of conventional ejection seat guide rails, the ejection seats and guide rails not being shewn. There is a separate firing unit 39 and allied parts for the front and rear hoods. The front and rear hoods may be jettisoned independently.

Fig. 5 illustrates a further arrangement having a time delayed firing unit 44, the fluid pressure generated in the firing unit passing along pipe lines 45, 46 to the cylinders 47 of the jack pistons, connecting rods 48 being secured to known canopy or hood rail latch locks 49. The cylinders and jack pistons and connecting rods are similar to those described in relation to Figs. 1 and 2. The time delayed firing unit is described later with reference to Figs. 8 to 12 of the drawings.

In the constructions described up to now, the latch locks have been mechanically released by displacement of the main jack pistons when these are moved by the fluid pressure. In the construction about to be described and illustrated by Figs. 6, 7 and 13 there is a prior release of the latch locks by displacement by the fluid pressure of an auxiliary piston control before the fluid pressure passes to the cylinders of the jack pistons. This can be called a by-pass control.

As will be seen from Fig. 6 an auxiliary piston 50 works in a cylinder 51 formed in a fitting 52 secured at a suitable part of the aircraft. The bore of the cylinder 51 communicates with a fitting 52 through which fluid pressure is conveyed from the firing unit. This latter may be the time delayed firing unit described later in this document.

The fitting 52 has lateral bores 53, connecting the cylinder 51 with pipes 54 through which fluid pressure is conveyed to the cylinders of the jack pistons.

The piston 50 has a rod 55 which projects through a gland 56 at the end of the cylinder 51. This rod 55 when fluid pressure enters the cylinder 51 contacts an extended head 57 on a trip lever 58 which latter is coupled to known means for releasing the latch locks.

When fluid pressure enters the cylinder 51 from the pipe 52, the piston 50 moves downwardly and with it the rod 55, whereby the trip lever 58 is given a turning movement about its fulcrum point 59 (see Fig. 7) and the latch locks are released. It will be noted that during the first part of the stroke of the piston 50 the bores 53 leading to the pipes to the cylinders of the jack pistons are still blocked by the piston 50, and are not uncovered until the trip lever has been moved sufficiently by the rod 55 to release the latch locks.

The assembly illustrated by Figs. 8 to 12, is for use with a known ejection seat which is ejected from the aircraft by the firing of an ejection gun.

In this particular example actuation is by way of a known blind or screen (not shown) adapted to be drawn into position over the face of the occupant of the seat before, and to remain in position during, the launching of the seat and its occupant from the aircraft.

It will be appreciated that the firing of the gun for the jettisoning mechanism and the firing of the ejection gun must be in sequent order, the jettisoning mechanism being the first to be actuated.

For the purpose of operating the hood jettison mechanism in combination with an ejection seat, not shown, it is desirable that one movement by the airman should be sufficient. In the arrangement shown this is achieved by the use of twin cable connections 60 and 61 from the known face blind, not shown, of the ejection seat. The time delay mechanism consists of a spring loaded tubular rack 62 in engagement with a train of gears forming an escapement and indicated generally by 63, the whole being contained within a housing 64 surmounted by a torque shaft 65 bearing two levers 66 and 67. A third lever 68 pivoted directly below the torque shaft 65 serves as a trip lever, the end of the torque shaft 65 being suitably slotted at 65a to accommodate a cocking tool.

To cock or set the mechanism the appropriate tool is introduced into the slot 65a in the torque shaft and turned clockwise, whereby the roller 69 at the end of lever 66 bears down on the rack barrel 62 compressing the spring 70 until the roller 69 reaches the position shown in Fig. 11, where it is retained by the offset thrust of the rack. In the last part of this movement the roller 69 comes in contact with the heel of the trip lever 68 causing this lever to assume an erect position and to trap the eye-end 71 of the trip cable 60 against the lever boss. In this position the articulated link 73 may be engaged with the sear 74 of the firing mechanism which may be used for ejecting a conventional pilot seat. Adjacent to the time delay mechanism and integral with the housing 64 is a breech mechanism consisting of a firing body 75 with firing pin 76 operated by the withdrawal of a sear 77 and engaging this sear is the eye-end 78 of the trip cable 61. In the fully cocked condition the arrangement is as shown in Fig. 8 and this is the normal condition during flight.

The sequence of operation when the seat is ejected from an aircraft is as follows:

When a pilot pulls the common cord which is connected to both cords 60 and 61 the cable 61 withdraws the sear 77 and the firing pin 76 fires the cartridge 79 immediately and the hood is first released and then jettisoned. Simultaneously the time delay mechanism is tripped in a reversal of the manner previously described with regard to cocking, that is to say, the heel of the trip lever 68 forces the roller 69 up away from the rack 62 and thus permits the rack 62 to rise. When this happens the movement of the lever 66 is transmitted by the torque shaft 65 to lever 67 which, through the articulated link 73, withdraws the sear 74 of the second firing mechanism which may be used to eject a seat not shown, this operation taking about 1–1½ seconds by which time the hood or canopy has completely cleared the ejection path of the seat. Where it is required only to jettison the canopy or hood and not to eject the seat a further connection by a cable 72, or some other suitable means, is made to the hood jettison sear 77. The other extremity of this cable terminates in a handle (not shown) which may be mounted at some convenient position on the aircraft structure and the operation of this control will withdraw the hood jettison sear 77 only, without setting in motion the time delay mechanism.

It will be apparent that the invention can be variously modified and changed within the scope of the appended claims.

I claim:

1. For an aircraft having a canopy, a canopy jettisoning system comprising the combination of latches for releasably securing said canopy on the aircraft, latch release mechanism connected to said latches, means for actuating said latch release mechanism to free the canopy when subjected to fluid pressure, fluid pressure operable jacks attached to the aircraft and so positioned that they operate against the lower edge of said canopy and are engageable with a part of said latch release mechanism, said jacks comprising cylinders and pistons displaceable under fluid pressure admitted to said cylinders, a single common fluid pressure generation chamber, an explosive charge in said chamber, means for firing said charge to generate fluid pressure in said chamber, conduits connecting said chamber to the cylinder of each of said jacks, such that movement of said jack pistons by said fluid pressure first releases said latches to free said canopy and further movement of said jack pistons then lifts and jettisons said canopy.

2. For an aircraft having a canopy, a canopy jettisoning system comprising in combination, latches for releasably securing said canopy on an aircraft, latch release means connected to said latches, fluid pressure operable jacks for attachment to the aircraft and so positioned that they operate against the lower edge of said canopy and are engageable with a part of said latch release means, said jacks comprising cylinders and pistons displaceable under fluid pressure, said pistons being adapted during the first part of their displacement to actuate said latch release mechanism to free said canopy and then later in their displacement themselves to lift and jettison said canopy, fluid pressure generating chamber, an explosive charge in said chamber, means for firing said charge, conduits connecting said chamber with the cylinder of each of said jacks and adapted to convey fluid pressure from said chamber to each of said jack pistons thereby first to free said canopy and then to lift and jettison the freed canopy.

3. For an aircraft having a canopy, a canopy jettisoning system comprising the combination of latches for releasably securing said canopy on the aircraft, fluid pressure operable jacks attached to the aircraft and so positioned that they operate against the lower edge of said canopy, said jacks comprising cylinders and pistons displaceable under fluid pressure admitted to said cylinders, each of said jack pistons being provided with a shoulder, a pawl pivotally mounted on said aircraft and having one end in contact with said shoulder and the other end connected to a rod, the other end of the rod being connected to said latch to release it upon upward movement of said jack piston, a single common fluid pressure generating chamber, an explosive charge in said chamber, means for firing said charge to generate fluid pressure in said chamber, conduits connecting said chamber to the cylinder of each of said jacks, said pressure when generated causing said jack pistons to move, the first movement of the pistons actuating said pawl and rod to release said latches and free the canopy, the further movement of the pistons causing said freed canopy to be lifted and jettisoned.

References Cited in the file of this patent

UNITED STATES PATENTS

| | | |
|---|---|---|
| 1,803,018 | Hicks | Apr. 28, 1931 |
| 2,466,980 | Bronson | Apr. 12, 1949 |
| 2,615,659 | Gardner et al. | Oct. 28, 1952 |
| 2,709,556 | Jandris | May 31, 1955 |
| 2,736,522 | Wilson | Feb. 28, 1956 |
| 2,749,063 | Low | June 5, 1956 |
| 2,822,207 | Steinmetz et al. | Feb. 4, 1958 |

FOREIGN PATENTS

| | | |
|---|---|---|
| 852,811 | Germany | Oct. 20, 1952 |